United States Patent [19]

Riordan

[11] Patent Number: 4,755,650
[45] Date of Patent: Jul. 5, 1988

[54] FUSING MACHINE, METHOD AND ELECTRODE SET

[75] Inventor: Edward D. Riordan, S. Somerville, N.J.

[73] Assignee: Joyal Products, Inc., Linden, N.J.

[21] Appl. No.: 937,711

[22] Filed: Dec. 4, 1986

Related U.S. Application Data

[62] Division of Ser. No. 566,708, Dec. 19, 1983, Pat. No. 4,650,948.

[51] Int. Cl.⁴ .............................................. B23K 11/10
[52] U.S. Cl. .................... 219/56.22; 219/91.2
[58] Field of Search ............ 219/56, 56.1, 56.22, 219/91.2, 91.21, 91.23, 86.1

[56] References Cited

U.S. PATENT DOCUMENTS

| | | | |
|---|---|---|---|
| 2,288,348 | 6/1942 | Funk | 219/91.23 X |
| 2,967,228 | 1/1961 | Tindall | 219/119 |
| 3,037,108 | 5/1962 | Piollevey | 219/56 |
| 3,421,212 | 1/1969 | Chabot | 219/91.21 X |
| 3,793,503 | 2/1974 | Warner | 219/56.1 X |

FOREIGN PATENT DOCUMENTS 103286 8/1980 Japan .............................. 219/56.1

*Primary Examiner*—E. A. Goldberg
*Assistant Examiner*—C. M. Sidga
*Attorney, Agent, or Firm*—Lerner, David, Littenberg, Krumholz & Mentlik

[57] ABSTRACT

A fusing machine and method employ a first electrode which defines a fusing station and a second electrode which is movable toward and away from the first electrode. Two wires which have been fused together at the fusing station are automatically cut without removing the fused wires from the fusing station prior to cutting them. Also disclosed is an electrode set including a first electrode having an inwardly tapered slot sized and shaped so as to releaseably capture wires to be fused and a second electrode having a straight-sided tip sized and shaped so as to be freely movable into and out of the slot in the first electrode.

2 Claims, 4 Drawing Sheets

FUSING MACHINE, METHOD AND ELECTRODE SET

This is a division of application Ser. No. 566,708, filed 12/19/83, now U.S. Pat. No. 4,650,948.

FIELD OF THE INVENTION

The present invention relates to fusing apparatus and methods, and, more particularly, to such apparatus and methods which are especially adapted to fuse insulated magnet wire to tinned stranded wire. The apparatus and methods are also especially useful in producing pigtail connections between such wires.

BACKGROUND OF THE INVENTION

In the past, fusing machines have been developed for fusing together a pair of wires. Generally, there are two basic types of fused connections: a pigtail connection and a splice connection.

In a pigtail connection, the wires are fed in the same direction and positioned between a pair of electrodes in piggyback fashion (i.e., one above the other) such that their free ends extend beyond a fusing station defined by the electrodes. After a fusing operation, the fused wires are removed from the fusing station and the excess wire is manually trimmed.

In making a splice connection, the wires are fed in opposite directions and positioned between a pair of electrodes such that their free ends overlap. After a fusing operation, the wires are removed from the fusing station defined by the electrodes, no trimming being necessary.

Various electrode configurations have been employed by these prior art fusing machines. For instance, one electrode set includes a first electrode which is provided with a relatively wide inwardly tapered slot having sidewalls which form between them an included angle of about 60°. A second electrode has a tapered tip which is designed such that its taper substantially matches the taper of the slot in the first electrode. Because the slot in the first electrode is relatively wide, it is difficult to maintain two wires in a piggyback arrangement in the slot because the wire located in the wider portion of the slot will tend to move laterally in the slot. Also, because the two electrodes have matching shapes, there is a tendency for strands of a stranded wire to become trapped between the sidewall of the slot in the first electrode and the tip of the second electrode. Any such trapped strands can be inadvertently fused to one of the electrodes.

SUMMARY OF THE PRESENT INVENTION

The present invention overcomes many of the problems and disadvantages of the prior art devices described above. For instance, in accordance with one aspect of the present invention, two wires which have been fused together at a fusing station defined by at least one electrode of an electrode set are automatically cut without removing the fused wires from the fusing station prior to cutting them. The automatic cutting operation eliminates the need to cut the wires manually, thereby reducing handling and the time required to produce a fused and trimmed connection.

In one embodiment, the wire cutting operation is performed by a movable cutter positioned adjacent to the fusing station. More particularly, the cutter is pivotally mounted such that it can be pivoted between a cutting position in which the cutter is adjacent to the fusing station and a non-cutting position in which the cutter is remote from the fusing station. The cutter includes a first cutting member and a second cutting member which reciprocates relative to the first cutting member so as to shear wires which have been fused together at the fusing station. The first cutting member includes a notch sized and shaped so as to permit the wires to be fused to be inserted laterally into the notch. The notch terminates inwardly in a generally cylindrical head sized and shaped so as to receive the wires to be fused. The notch is also provided with an inwardly tapered throat extending between an outer edge of the first cutting member and the head of the notch.

Another aspect of the present invention involves an electrode set which includes a first electrode having an inwardly tapered slot sized and shaped so as to releasably capture wires to be fused and a second electrode having a straight-sided tip sized and shaped so as to be freely movable into and out of the slot in the first electrode. The straight-sided tip on the second electrode inhibits strands of stranded wire from being trapped between the electrodes, thereby reducing the possibility of the wires sticking to one of the electrodes due to the inadvertent fusing of the stranded wire to the electrode.

In order to fuse an insulated magnet wire to a tinned stranded wire, the magnet wire and the stranded wire are inserted into the slot in the first electrode such that the stranded wire is above the magnet wire. Thereafter, the second electrode is moved such that its tip enters the slot in the first electrode and engages the stranded wire. During subsequent energization of the first and second electrodes, sufficient heat and pressure are generated to fuse the stranded wire to the magnet wire.

BRIEF DESCRIPTION OF THE DRAWINGS

For a more complete understanding of the present invention, reference is made to the following description of an exemplary embodiment considered in conjunction with the accompanying drawings, in which.

DETAILED DESCRIPTION OF THE EXEMPLARY EMBODIMENT

Referring generally to FIGS. 1–9, there is shown a fusing machine 10 which includes an upper electrode subassembly 12, a lower electrode subassembly 14 and a cutter subassembly 16.

Figure 1:
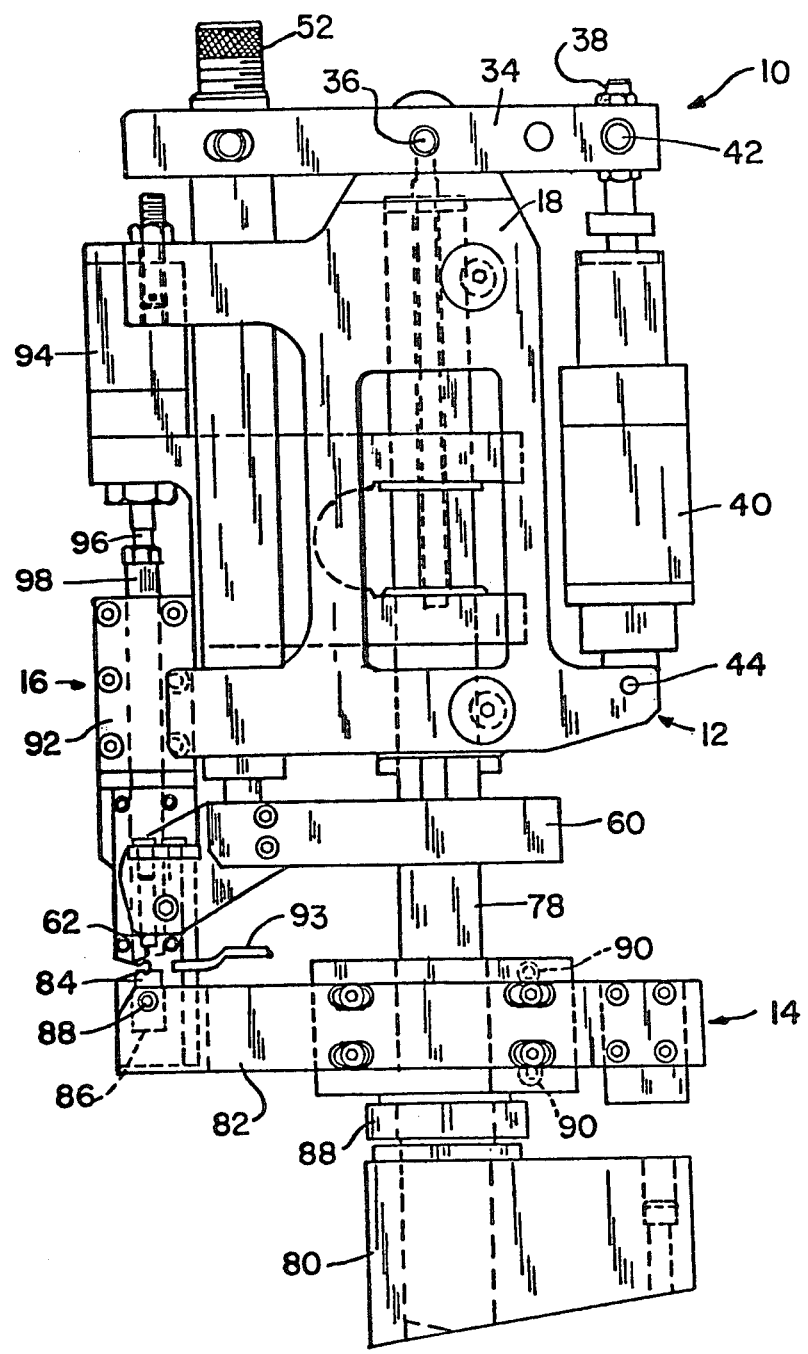
FIG. 1 is a side elevational view of a fusing machine constructed in accordance with the present invention.
Figure 3:
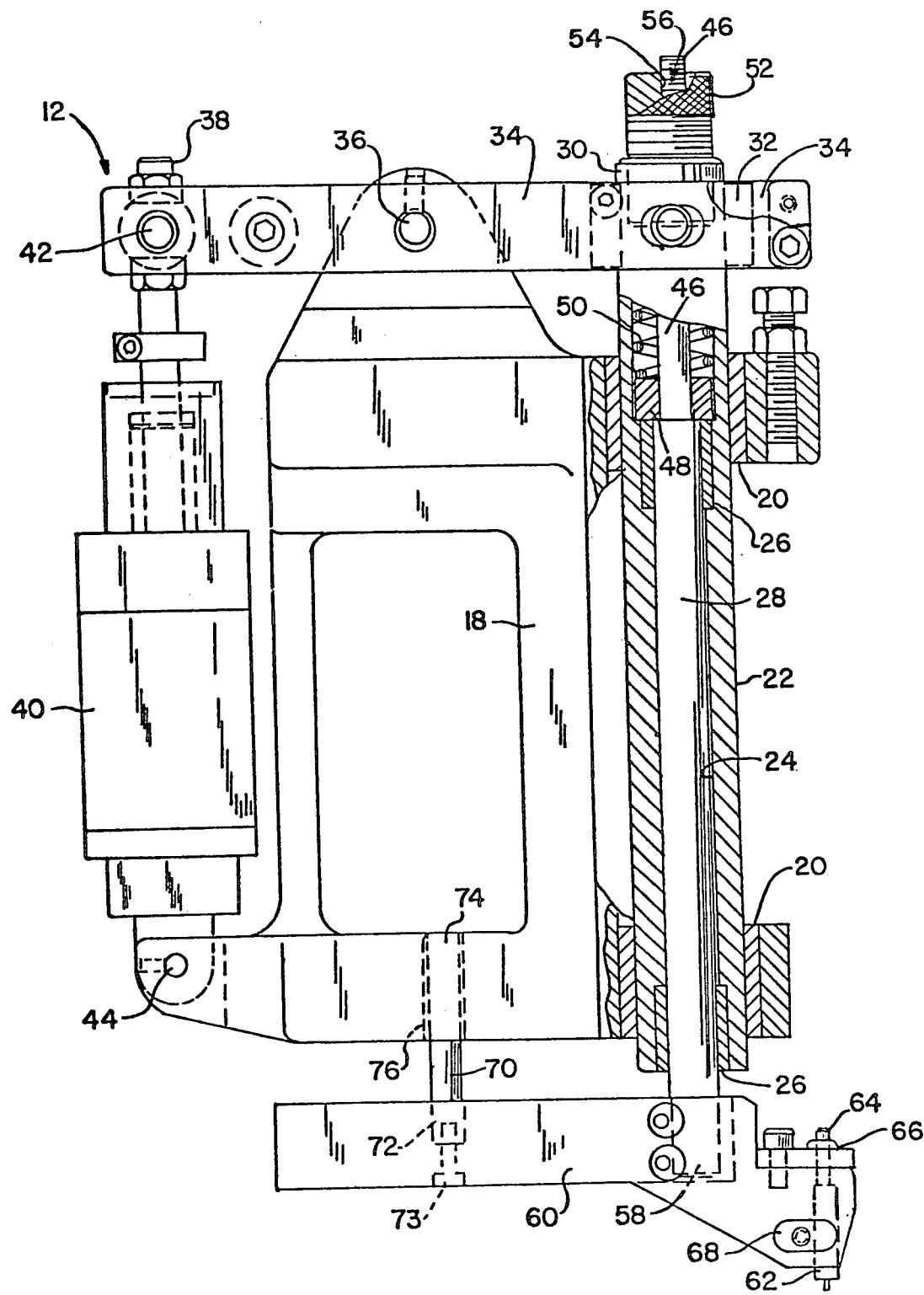
FIG. 3 is a partial cross-sectional view of an upper electrode subassembly employed by the fusing machine illustrated in FIGS. 1 and 2.

With particular reference to FIGS. 1 and 3, the upper electrode subassembly 12 includes a main body 18 having bushings 20 which slidably receive an outer shaft 22. A bore 24 provided in the outer shaft 22 includes bushings 26 which slidably receive an inner shaft 28. An upper end 30 of the outer shaft 22 is attached by a trunnion 32 to arms 34 which are pivotally mounted by a pivot pin 36 to the main body 18. The arms 34 are pivotally attached by a pivot pin 42 to a piston shaft 38 of a pneumatic cylinder 40, which is pivotally attached to the main body 18 by a pivot pin 44.

An upper end 46 of the inner shaft 28 has a smaller diameter than the rest of the inner shaft 28. A spring pad 48, which is pinned to the upper end 46 of the inner shaft 28, supports a compression spring 50. A preload cap 52 is threadedly received in the upper end 30 of the outer shaft 22. A bore 54 provided in the preload cap 52 receives the upper end 46 of the inner shaft 28. The compression spring 50 is positioned between the preload cap 52 and the spring pad 48. Markings 56 on the upper end 46 of the inner shaft 28 are provided to indicate the preset pressure exerted on the compression spring 50 by the preload cap 52. The pressure exerted on the compression spring 50 can be adjusted by screwing the preload cap 52 into or out of the upper end 30 of the outer shaft 22.

A lower end 58 of the inner shaft 28 is attached to an upper electrode holder 60 which receives an upper electrode 62. A set screw 64 and a nut 66 cooperate to regulate the vertical position of the upper electrode 62. The upper electrode 62 is fixed in place by a clamp 68. A guide shaft 70 has a lower end 72 which is fixedly attached to the electrode holder 60 by a bolt 73 and an upper end 74 which is slidably received in a bushing 76 provided in the main body 18. The guide shaft 70 functions to prevent the upper electrode holder 60 from rotating about a vertical axis.

Figure 2:
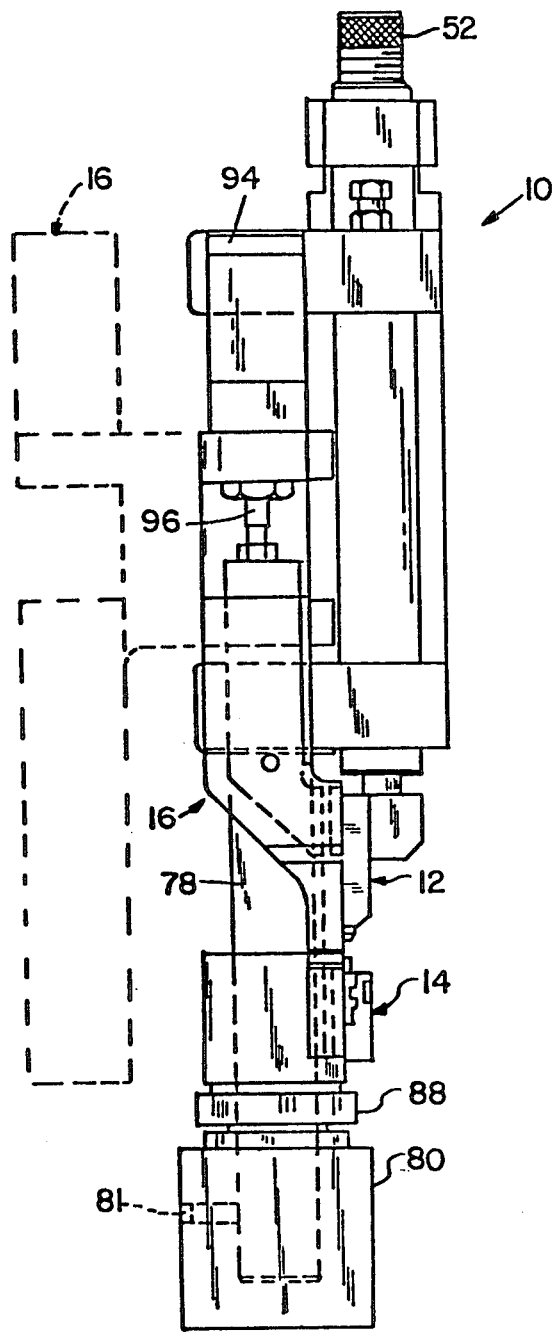
FIG. 2 is a front elevational view of the fusing machine illustrated in FIG. 1.

With particular reference to FIGS. 1 and 2, the main body 18 is rotatably mounted on a post 78, which is fixedly attached to a mounting block 80 by a pin 81 (see FIG. 2). The post 78 is tilted away from an operator to facilitate operation by improving the operator's vision (see FIG. 1).

Referring still to FIGS. 1 and 2, the lower electrode subassembly 14, includes a lower electrode holder 82 which is rotatably mounted on the post 78 so that the lower electrode holder 82 can be horizontally adjusted to properly position a lower electrode 84 held thereb beneath the upper electrode 62. More paricularly, the lower electrode 84 is removably received in a pocket 86 formed in the lower electrode holder 82. A screw 88 locks the lower electrode in place in the pocket 86. The lower electrode holder 82 can be moved up and down on the post 78 by a nut 88, which is threadedly mounted on the post 78. By tightening screws 90, the lower electrode holder 82 can be clamped in place. A tube 93 is attached to a fan (not shown) and positioned so as to provide an air blast to the fusing area for the purpose of dispersing the fumes generated during a fusing operation.

Figure 4:
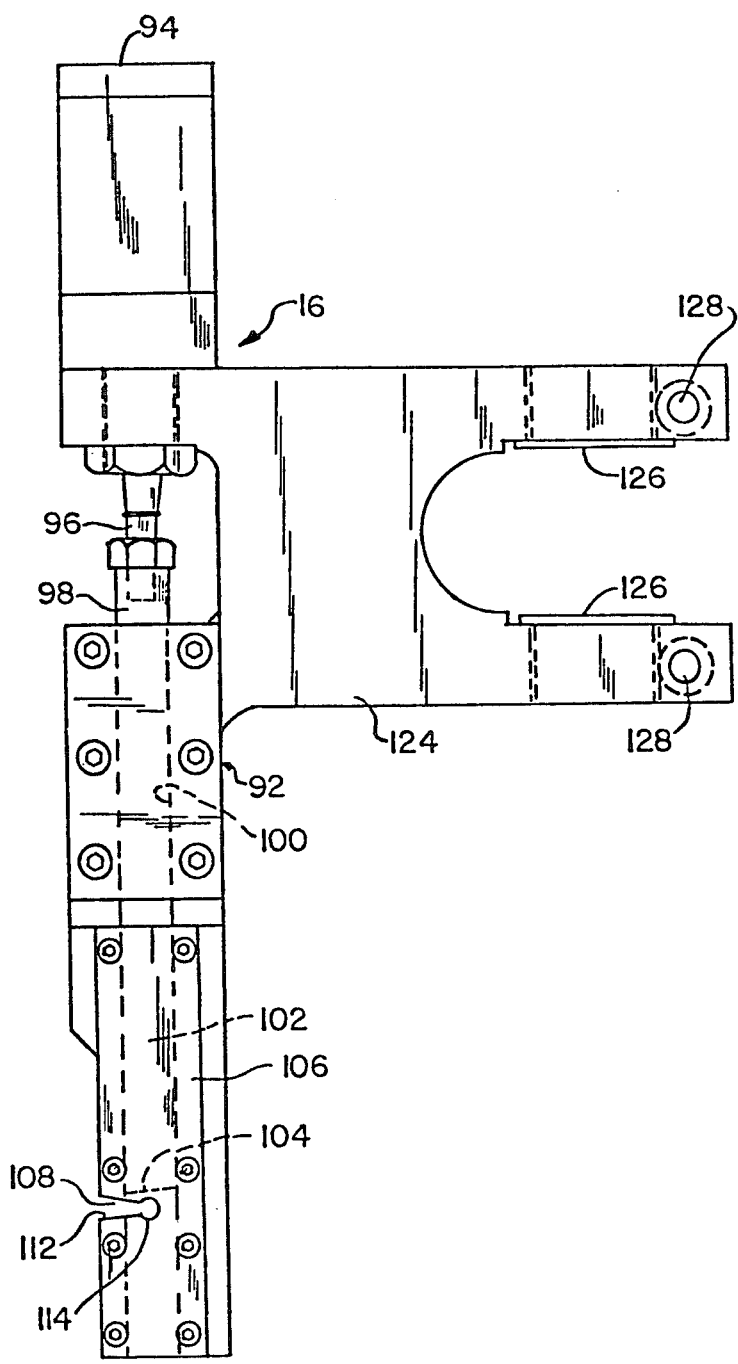
FIG. 4 is a side elevational view of a cutter subassembly employed by the fusing machine illustrated in FIGS. 1 and 2.
Figure 5:
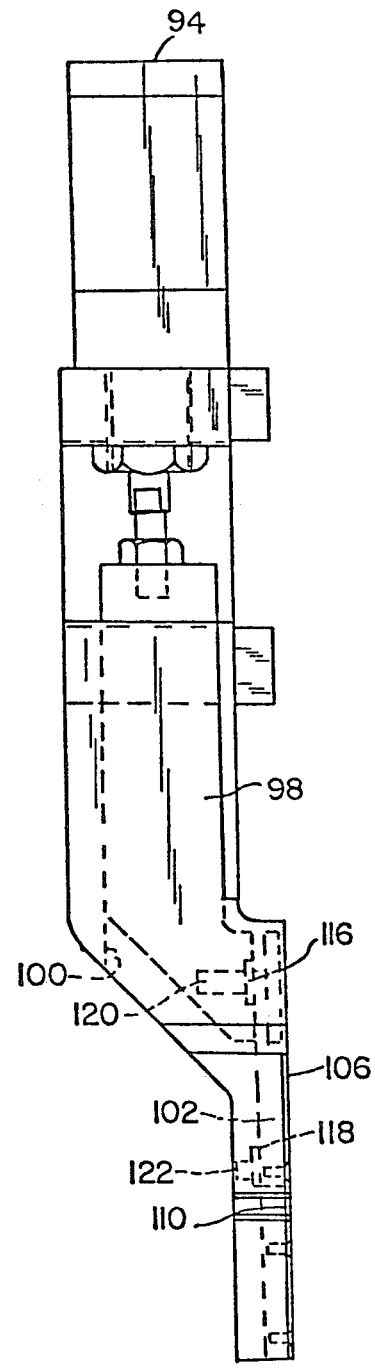
FIG. 5 is a front elevational view of the cutter subassembly shown in FIG. 4.

With particular reference to FIGS. 4 and 5, the cutter subassembly 16 includes a housing 92 which is pivotally attached to the post 78 (see FIGS. 1 and 2). A pneumatic cylinder 94 is mounted on the housing 92. The pneumatic cylinder 94 has a piston shaft 96, which is attached to a slide 98. A channel 100 within the housing 92 receives the slide 98. A cutter 102 having a cutting blade 104 is removably attached to the slide 98. A cutter keeper 106, which is screwed to the housing 92, cooperates with the cutter 102 to perform a wire cutting operation. More particularly, the cutter keeper 106 has a notch 108 sized and shaped so as to receive the wires to be fused and cut. The notch 108 is provided with an inner cutting edge 110 which cooperates with the cutting blade 104 of the cutter 102 to cut the wires as the cutter 102 is reciprocated relative to the cutter keeper 106 by the pneumatic cylinder 94. The notch 108 has an inwardly tapered throat 112 to facilitate the insertion of the wires into the notch 108. Also, the notch 108 terminates in a circular head 114 adapted to inhibit the wires from inadvertently falling out of the notch 108.

Two pressure pads 116, 118 are provided behind the cutter 102. Set screws 120, 122 associated with the pads 116, 118, respectively, urge the pads 116, 118 against the cutter 102 to keep the cutter 102 against the cutter keeper 106. The pressure pad 116 is positioned in the slide 98, while the pressure pad 118 is positioned in the housing 92.

An extension 124 of the housing 92 is provided with a pair of electrical insulating bushings 126, which are slidably and rotatably mounted on the post 78. Screws 128 lock the housing 92 in place.

Figure 6:
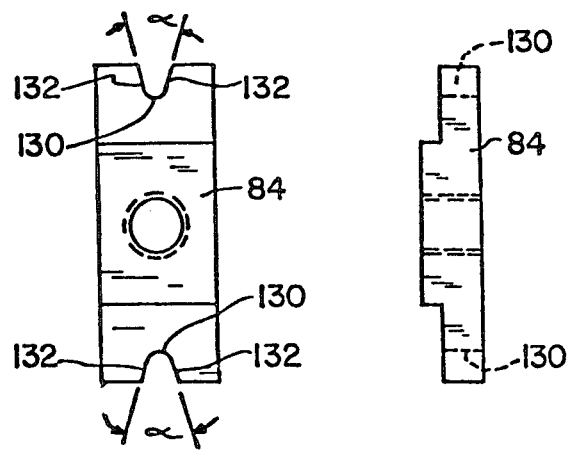
FIG. 6 is a side elevational view of a lower electrode employed by the fusing machine illustrated in FIGS. 1 and 2.
Figure 7:
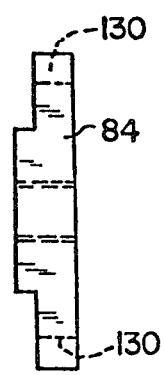
FIG. 7 is a front elevational view of the lower electrode illustrated in FIG. 6.

Referring now to FIGS. 6 and 7, the lower electrode 84 includes a pair of inwardly tapered slots 130. Each of the slots 130 has a pair of inclined sidewalls 132 which form between them an included angle of about 10°. The slots 130 are wide enough and deep enough to receive two wires, such as a magnet wire and a stranded wire, in a piggyback relationship (i.e., the stranded wire above the magnet wire), but it must also be narrow enough to maintain the wires in this piggyback relationship. Because there are two of the slots 130, if one becomes worn the other can be put into service by removing the lower electrode 84 and inverting it. Of course, the lower electrode 84 is removably held by the lower electrode holder 82 so that the lower electrode 84 can be removed and replaced when both of the slots 130 become worn.

Figure 8:
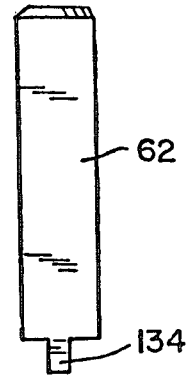
FIG. 8 is a side elevational view of an upper electrode employed by the fusing machine shown in FIGS. 1 and 2.
Figure 9:
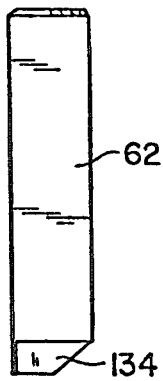
FIG. 9 is a front elevational view of the upper electrode shown in FIG. 8.

With reference to FIGS. 8 and 9, the upper electrode 62 includes a straight-sided tip 134. The size and shape of the tip 134 are selected such that the tip 134 is freely movable into and out of either of the slots 130 in the lower electrode 84.

In order to fuse insulated magnet wire to tinned stranded wire in a pigtail connection, the insulated magnet wire is positioned in one of the slots 130 provided in the lower electrode 84. A stripped portion of the stranded wire is then laid on top of the magnet wire. The ends of the magnet wire and the stranded wire are inserted into the notch 108 in the cutter keeper 106 of the cutter subassembly 16. Through the initiation of appropriate controls, the upper electrode 62 is automatically lowered until the tip 134 thereof contacts the stripped portion of the stranded wire and deforms it so as to establish contact with the lower electrode 84. The compression spring 50 maintains pressure on the wires by constantly forcing the upper electrode 62 downward toward the lower electrode 84. Electrical current is then applied to the upper electrode 62 and the lower electrode 84, thereby creating heat therein which, in turn, is transferred to the stranded wire and the magnet wire. The heat transferred to the magnet wire vaporizes the insulation thereon so as to establish a second current path between the upper electrode 62 and the lower electrode 84, thereby permitting the magnet wire to be further heated. The continued heating of the stranded wire and the magnet wire creates a fused joint which is devoid of any insulation.

At the conclusion of the fusing operation, the upper electrode 62 maintains pressure on the fused wires while the cutter subassembly 16 is actuated to trim the excess wire such that the fused wires are trimmed in close proximity to the fused joint. More particularly, when the piston shaft 96 is retracted, the cutting blade 104 of the cutter 102 is positioned above the notch 108 in the cutter keeper 106. Upon actuation of the pneumatic cylinder 94, the piston shaft 96 is extended a distance sufficient to move the cutting blade 106 of the cutter 102 past the notch 108 in the cutter keeper 106, whereby the cutting blade 104 of the cutter 102 cooperates with the cutting edge 110 of the cutter keeper 106 to cut the wires received in the notch 108.

After the wires have been cut, the cutter 102 and upper electrode holder 60 are simultaneously raised. The cut and trimmed wires are then removed from the fusing machine 10.

The fusing machine can also be used to splice two wires together. When splicing, there is no need for the cutter subassembly 16 and, therefore, it is pivoted from its cutting position shown in solid lines in FIG. 2 to its non-cutting position shown in phantom in FIG. 2.

It will be understood that the embodiment described herein is merely exemplary and that a person skilled in the art may make many variations and modifications without departing from the spirit and scope of the invention. All such variations and modifications are intended to be included within the scope of the invention as defined in the appended claims.

I claim:

1. A method of fusing together magnet wire and stranded wire, comprising the steps of providing a first electrode which includes an inwardly tapered slot having two opposed, inclined sidewalls and being sized and shaped so as to releaseably capture said magnet wire and said stranded wire, providing a second electrode which includes a tip having two oppositely-facing parallel walls and being sized and shaped so as to be freely movable into and out of said slot in said first electrode, inserting said magnet wire and said stranded wire into said slot in said first electrode such that said stranded wire is above said magnet wire, moving said second electrode such that said tip thereof enters said slot in said first electrode with substantial portions of said parallel walls of said tip confronting said inclined sidewalls of said slot and said tip engages said stranded wire, energizing said first and second electrodes to an extent such that the heat and pressure generated by said first second electrodes fuse said stranded wire to said magnet wire.

2. A fusing method according to claim 1, wherein said inclined sidewalls form between them an included angle of about 10°.

* * * * *